Patented Nov. 1, 1932

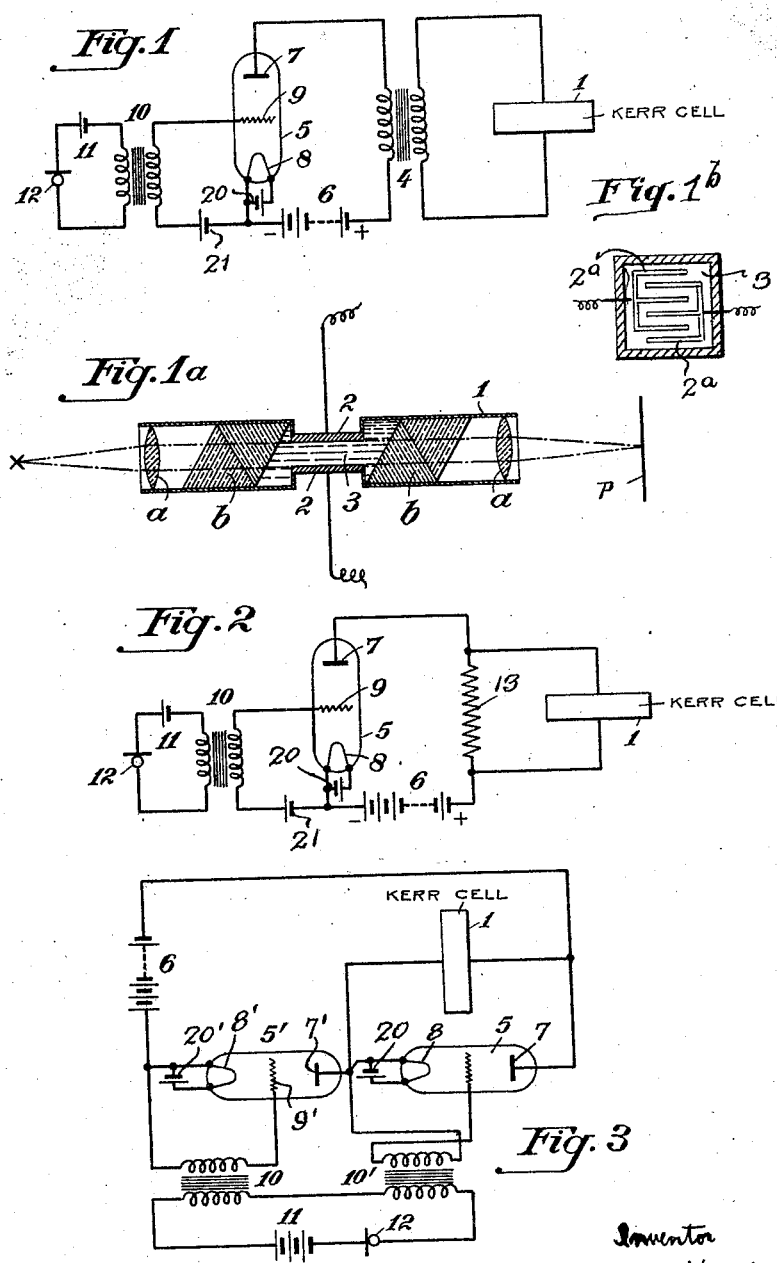

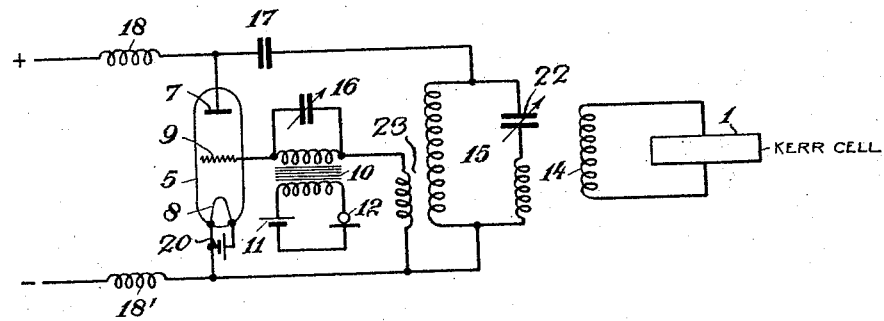
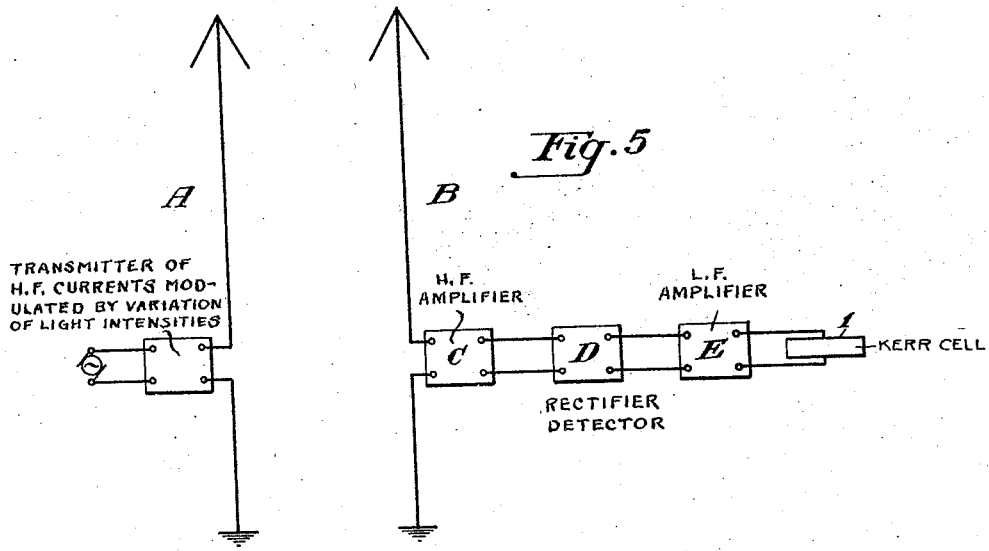
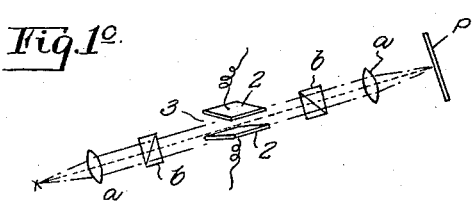

1,885,604

UNITED STATES PATENT OFFICE

AUGUST KAROLUS, OF LEIPZIG, GERMANY, ASSIGNOR TO RADIO CORPORATION OF AMERICA, A CORPORATION OF DELAWARE

INSTANTANEOUS CONTROL OF LIGHT

Application filed June 2, 1925, Serial No. 34,338, and in Germany June 20, 1924.

The invention relates to a method of and apparatus for the instantaneous control of light by electrical fluctuation of voltage for use in optically representing or photographically recording periodic variations up to very high frequencies such as are used for photo-telegraphy, in tele-vision, for sound reproducing films (talking movies), light beam telegraphy and telephony over short or great distances and other similar purposes.

While the methods of light control used in the art for such purposes up to now are limited as regards their usefulness and efficiency partly by the inertia of the control elements which are apt to produce distortion at high frequencies, partly by the small intensity of the light, partly by other faults such as small total efficiency of control, great consumption of energy, and failure to obtain sharp impressions of the source of light (in case of gas discharge tubes), the invention provides a means for faithfully controlling any practical amount of light at a negligible energy expenditure, up to frequencies of over ten million oscillations per second. It permits also, if necessary, a sharp reproduction of the source of light on the receiving surface.

The light control is effected according to the invention by means of a so-called "Kerr cell" i. e. by utilizing the known phenomenon of electrical double refraction by which term is designated in physics the peculiar property of certain liquids when exposed to strong electric fields to dissolve polarized light into two components of different propagation speed. Reference in this connection is made to the Philosophical Magazine of 1875, article by Kerr entitled; 'A new relation between electricity and light'.

A Kerr cell according to the present invention constitutes a cell with transparent parallel end walls through which the beam of light to be controlled passes. The cell contains usually two electrodes arranged opposite to each other and acting electrically as a condenser, the light beam passing between these electrodes. The cell is filled with a suitable optically double refracting medium, usually a liquid or an emulsion or colloidal substance of such small insulation loss and other small dielectric losses, that the control of light beams up to the greatest practical intensities may be effected practically without energy consumption, i. e. the cell constitutes for all practical purposes electrically a purely potential controlled element, similar in this respect to the grid element of a three electrode thermionic tube. Owing to the arrangement of the cell and the great dielectric strength and small conductivity of the media attained, it becomes possible in contradistinction to Kerr cells, heretofore known in physics, to move the two electrodes between which the light beam passes—usually in the form of parallel rays—so close together, that the great electrostatic field intensities, necessary for producing a considerable double refraction, can already be produced at comparatively low potentials, for instance voltages obtainable with ordinary commercial vacuum tube amplifiers, without thereby incurring appreciable losses.

Before entering the Kerr cell, the light beam to be controlled by the cell is polarized by suitable means. I preferably use two so-called Nicol prisms between which the cell is disposed and the first of which serves as a polarizer, and the second as an analyzer. Without having any potential on the cell electrodes, the two prisms may be axially turned relatively to such an angle that the light beam fails to pass through the system. If then suitable potential is applied to the cell electrodes, the light beam, polarized by the first Nicol prism, is double refracted with the effect that now the light beam passes through the system. By the electric field intensity and distribution between the cell electrodes the phase difference between the polarized beam components is determined and thus according to the degree of interference between the ordinary and extraordinary rays produced, the resulting light intensity may be controlled between zero and maximum.

As according to the invention in practice media are used in the Kerr cell which in consequence of their small dielectric loss do not put a current load on the source of voltage connected to the cell electrodes, the necessary voltage can easily be obtained for the electrodes of the cell by transforming the varying potential according to which the light beam is to be controlled and which may be produced for instance in a microphone or similar device, into a sufficiently high potential as may be required for the purpose. In certain liquids, e. g. nitrobenzene or derivatives, the following marked conditions are met in cells having a short distance between the plates and about 1,000 volts or less potential difference therebetween. Potentials within this order are easily controlled and produced by means of the present amplifying devices in combination with transformation, especially with true voltage amplifying connections, and the means used therefor can be kept sufficiently free from loss; also the transformation-ratios of the transformer winding have no distorting effect in an electrical sense.

Thus my novel arrangement constitutes a substantial improvement, effected by the invention, as previously voltages of a high order were considered necessary for producing the Kerr effect, an order which would render the cell useless for practical purposes such as are mentioned at the beginning.

The following are further features of the invention. I have found that the conductivity of the media used, for example nitrobenzene, can be decreased and the cell be thus improved by applying temporarily, or preferably continuously a direct current voltage to the cell. The beneficial result of this expedient is probably to be ascribed to electro-chemical action which separates the constituent conductive particles, probably moisture or traces of acid at the electrodes. Of course the purest obtainable substances should be used and for this purpose they should be chemically refined, for instance by distillation, desiccation or other suitable expedients. It is advantageous to operate with a direct current voltage permanently applied to the cell, whereby, entirely aside from the electrical and optical action hereinafter mentioned, a sufficient constancy of the cell with regard to the electrical characteristic of the medium is ensured.

By using suitable material for the cell itself and for its contents, it is possible to control quantitatively also invisible light, for instance ultra-violet light. For each kind of light, the total absorption during the passage through the cell must be small, that is, the cell contents must be of good transparency, since, the same as through dielectric loss in the condenser, a rise in temperature is also produced by absorption, which would alter the extent of the Kerr effect.

A further advantage of the previously mentioned superimposed continuous current voltage consists in thereby avoiding the doubling of frequency and in the increasing sensitiveness of control. If the condenser electrodes are supplied with pulsating or alternating current alone, which periodically rises above and falls below the zero value, a maximum and minimum light intensity would appear obviously twice during each period of the controlling alternating current. If however a suitable continuous current voltage is applied to the electrodes and the controlling alternating current is superimposed, the field retains its direction and the control frequency and the frequency of the light variations are the same. This method also ensures that even very small control voltages become effective, considering that the so-called Kerr effect with which we are dealing here is proportional to the square of the field strength.

It is further possible to increase the controlling action considerably as follows:

When the polarized light rays pass through a Kerr cell, the effect of the electric charge on its condenser plates is a phase difference between the ordinary and the extraordinary ray. This phase difference is proportional to the "Kerr effect" constant of the medium employed, to the length of the condenser (in the direction of the ray) and to the square of the electric field existing at the moment. The constant factor of the Kerr effect which appears as a linear value in the formula for the Kerr effect, is larger in the ultra violet range than in the visible spectrum (for instance with nitrobenzene as a cell medium from 5 to 10 times as great). Consequently a definite variation in light intensity can be produced with light of short wave length by using comparatively much lower control voltages at the cell electrodes, and vice versa for a given control voltage, conditions being otherwise equal, a much greater difference between high and low light intensity can be produced with short waves. Now if one should operate within a comparatively narrow range portion of the spectrum (in the extreme case with a single spectrum line) and if this portion is chosen from the short wave range, which contains the photographically or, generally speaking, chemically most actinic rays, the method employed becomes the more advantageous the more the range of the ultra violet rays is approached.

In order to obtain the aforementioned advantages, one would proceed with Kerr cells, and their circuit arrangements described herein, by applying to the electrodes of the cell, otherwise suitably dimensioned, a permanent direct current potential near the value at which the short wave portions of the rays used are allowed to just pass or are extinguished. The amplitude of the superimposed control voltage should then be made of such value only that the above described control of the strongest actinic waves (about violet and blue) just occurs. If the rays, after emerging from the cell and analyzer, act on a photo cell or like arrangement reacting selectively to light waves, for example, a photographic plate or film, there results an extraordinarily marked alteration in the response of such light sensitive elements. This "chromatic" control is broadly useful not only for photographic purposes but as well for other technical purposes, such as light beam telegraphy and telephony or also television, previously referred to.

A simple form of the invention is diagrammatically illustrated by the accompanying drawings, wherein:

Fig. 1 shows one method of connecting a Kerr cell in circuit with a thermionic amplifier;

Fig. 2 shows a modification of the arrangements shown by Fig. 1, wherein, the Kerr cell is connected across a resistor in the plate circuit of the amplifier;

Fig. 3 shows still a further modification in which the Kerr cell is associated with a plurality of vacuum tube amplifiers which are connected in series;

Fig. 4 shows still a further modification of an arrangement for associating the cell with a vacuum tube circuit;

Fig. 5 conventionally illustrates a showing by which energy is transmitted and received and caused to influence a Kerr cell;

Fig. 1a diagrammatically illustrates a preferred embodiment of one type of Kerr cell suitable for use in connection with the systems shown by Figs. 1 through 5, for example, in which this figure represents in longitudinal section the optical combination of a Kerr cell provided with a single pair of electrode elements and the associated Nicol prisms;

Fig. 1b discloses a modification of the showing in Fig. 1a where a transverse section of a multiple plate Kerr cell has been substituted for the single plate cell of Fig. 1a; and, Fig. 1c diagrammatically illustrates an angular arrangement of the electrode plates of a Kerr cell.

In these figures, 1 denotes the Kerr cell having condenser plates 2 between which the electrically doubly refracting medium 3, e. g. nitrobenzene is placed (Fig. 1a). The beam of light proceeding from the source of light is then passed in the usual way through lenses $a$ and polarization device $b$ such as a Nicol prism, between the plates 2 of the condenser through the refractory medium 3 and through the second Nicol prism $b$ serving as an analyzer, whence it is thrown on the sensitive surface or the photographic paper $p$. The Kerr cell may be provided with a system of several inter-positioned condenser plates, in place of only two condenser plates, which are then arranged in the usual way as in multi-plate condensers, such as are indicated by $2^a$ in Fig. 1b.

Usually the electrode or condenser plates are arranged in parallel to each other but they may also be arranged at an angle to one another, as shown by Fig. 1c, so that the electric field between them will be non-uniform. Similar arrangements may be useful also in connection with effecting the hereinbefore described chromatic control, the effect of which, with given voltages on the condenser, is determined by the local field strength and consequently by the geometrical relation (electrode spacing).

In most cases in which a Kerr cell, constructed and arranged as described hereinbefore, is employed, the control voltage amplitudes are too small to be directly applicable to the cell electrodes with the desired effect (such as small microphone currents or the like). It is therefore expedient to first amplify such small currents to a sufficient extent so that the necessary control voltages (say between 100 and 600 volts) become available for application to the cell electrodes. Means for such amplification are well known in the art and in Figs. 1, and 2–5, I have illustrated how such amplification may be applied to the present purpose. In all figures, 5 represents a three electrode thermionic tube having a plate or anode 7, a hot cathode or filament 8 heated by a battery 20 and a grid 9. 6 is the anode battery interposed between the anode and the cathode.

In the circuit shown in Figs. 1–4 it is assumed for simplicity that the control of the light through the Kerr cell is effected by amplified microphone currents. In Figs. 1, 12 indicates the microphone supplied from a source of current 11, the variation of current in the microphone being transferred to the grid circuit of the amplifier by means of a transformer 10. The variations of the anode current amplified by the tube are converted into suitable varying voltage by means of the transformer 4, which is connected to the plates of the condenser of the Kerr cell and by this means controls the beam of light according to the variations of the microphone current.

Figure 2 shows a voltage amplifying circuit using the tube 5 as a variable resistance. It differs from the arrangement of Fig. 1 in that the Kerr cell is placed in shunt across a resistance 13 connected in the anode circuit of the tube 5 which at the same time supplies the constant and the varying voltage for the cell. The amplified fluctuations of the anode current, correspond to the microphone currents, control the Kerr cell by a correspondingly varying potential.

The amplifying circuits described hitherto operate at purely low frequency, i. e. the variations of light are brought about by means of the Kerr cell only in accordance with the frequency of the microphone currents. For certain purposes, for instance, light telephony, whose range may be easily extended over great distances by this invention, or for photo-telegraphy and the like, it is preferable, however, in order to preserve secrecy and for obtaining a higher selectivity of the receiving circuit, to control the Kerr cell by means of a low frequency modulated high frequency. Thus high frequency amplification with its known advantages is made possible on the receiver side insofar as for example, in the case of photo-telegraphy, the arriving light impulses, into which on the transmitting side the Kerr cell has transformed the microphone current, act on a photo-cell, which is connected to a high frequency amplifier from which the amplified high frequency current is led to a detector so as to render the low frequency audible. In such cases of light telephony or in similar applications where the light is to be controlled by low-frequency modulated high frequency, the source of high frequency is provided by a generator, preferably by a thermionic tube transmitter, self- or outside-excited, in which the electrode circuit of the Kerr cell is connected, or in which the working circuit of the generator, or in which the Kerr cell forms part or all of the capacity of the oscillating output circuit. The high frequency is modulated by the lower frequency in one of the numerous known connections, so that the Kerr cell acts under the influence of a modulated high frequency. A tube transmitter with feed back connections is shown in Fig. 4 as an example of one method of reducing to practice such an idea. 15 represents the tunable oscillating circuit with which the Kerr cell is suitably connected in loose coupling through the transformer 14 which in turn is coupled to the grid circuit thru transformer 23. Circuit 15 is tuned by varying condenser 22. The control of the grid 9 of the oscillation tube 5 is effected by the transformer 10 whose primary winding is in circuit with microphone 12 and whose secondary winding is located in the grid circuit, but is shunted for the passage of the high frequency by the condenser 16. 17 is the usual plate condenser, 18 and 18′ are the high frequency choking coils in the current supply circuit for the anode. In this arrangement as will be seen without further explanation, the Kerr cell is controlled by a lower frequency modulated high frequency.

It is evident, without any further explanation, that the circuits illustrated and described can be used not only for transmitting microphone currents but also for recording any other fluctuating currents, such as for example are obtained in picture transmission or in tele-vision thru varying light intensities produced from a picture or written matter by the use of a photo cell, in well known manner. The fluctuating currents so produced may then be transformed into corresponding light fluctuations by the Kerr cell arrangement above described.

A circuit for radio transmitting images is shown in its general arrangement of units in Fig. 5. A indicates a tube transmitter. The high frequency oscillations produced by the tube are modulated in the usual way by the light and shade of the image to be transmitted. B denotes the receiving antenna, which co-operates with the usual receiving arrangements, composed of the high-frequency amplifier C, the rectifying detector D and the low frequency amplifier, E. The Kerr cell is connected, according to the invention, to the end of the low frequency amplifier, by which the rays of light are controlled in a manner corresponding to the flow of the modulated transmitting oscillations. The transmission of electric current from transmitter to receiver can be effected in the usual way both by wire or by radio transmission.

I declare that what I claim is:—

1. A Kerr cell for controlling light by electric current impulses comprising a plurality of electrodes and a transparent chamber containing said electrodes and being filled with a transparent liquid of suitable dielectric strength and small conductivity and adapted to become double refractory in the presence of an electric field produced between said electrodes, said electrodes being disposed opposite each other sufficiently close to permit the use of comparatively low voltage for causing said double refraction, and an amplifier connected to said electrodes and adapted to amplify the controlling current impulses to the required voltage, said amplifier comprising a thermionic tube having its input circuit connected to the source of pulsating current to be amplified and having a direct current source connected to the anode and cathode of said tube and having the electrodes of the Kerr cell suitably connected into the output circuit of the tube to receive the amplified current impulses, said direct current source having connections with the cell electrodes to simultaneously apply a direct current bias of suitable potential upon said cell electrodes.

2. A Kerr cell having a plurality of electrodes and a transparent liquid medium contained in said cell and adapted in the presence of an electrostatic field between said electrodes to produce electric double refraction of a light ray passing thru said cell, and means applied to said medium concurrently with the application of said electrostatic field for decreasing its electric conductivity during the period when said electrostatic field is applied to said cell.

3. A Kerr cell having a plurality of electrodes and a transparent liquid medium contained in said cell and adapted in the presence of an electrostatic field between said electrodes to produce electric double refraction of a light ray passing thru said cell, and a source of suitable direct current potential connected to said electrodes concurrently with the application of said electrostatic field for decreasing the electric conductivity of said medium during the period when said medium is rendered double refractory.

4. In combination, a Kerr cell having a plurality of electrodes and nitrobenzene contained in said cell, means for applying an electrostatic field upon the electrodes of the cell for producing electric double refraction of a light ray passing therebetween and means for simultaneously decreasing the electric conductivity of said nitrobenzene.

5. A Kerr cell having a plurality of electrodes and nitrobenzene contained in said cell which is adapted in the presence of an electrostatic field between said electrodes to produce electric double refraction of a light ray passing thru said cell and a source of suitable direct current potential connected to said electrodes simultaneously with the application of said electrostatic field for decreasing the electric conductivity of said nitrobenzene during the period when said electrostatic field is applied thereto.

6. A Kerr cell for controlling light by the application of electric potentials thereto comprising a plurality of electrodes and a transparent chamber containing said electrodes. said chamber being filled with a transparent liquid of suitable dielectric strength and small conductivity adapted to become double refractory in the presence of an electrostatic field produced between said electrodes, said electrodes being disposed opposite each other and sufficiently close to permit the use of comparatively low potentials for causing said double refraction, and means applied to said liquid for decreasing its electric conductivity while said electrostatic field is applied thereto.

7. A Kerr cell for controlling light by electric current impulses comprising a plurality of electrodes and a transparent chamber containing said electrodes, said chamber being filled with a transparent liquid of suitable dielectric strength and small conductivity and adapted to become double refractory in the presence of an electric field produced between said electrodes, said electrodes being disposed opposite each other sufficiently close to permit the use of comparatively low voltage for causing said double refraction, and a source of suitable direct current potential connected to said electrodes for decreasing the electric conductivity of said liquid while said electric field is applied thereto.

8. Method for chromatically controlling a polarized beam of light by electric current impulses by means of a Kerr cell, consisting in directing the light beam between the electrodes of the cell, in supplying current impulses to the cell electrodes and in applying to said electrodes a direct current potential, the pulsating current potential being suitably related to the direct current potential to permit the passage of only a definite frequency range of the total spectrum range of the light beam.

9. Method for electrically controlling a polarized beam of light by the use of a Kerr cell consisting in directing the light beam between the electrodes of the cell, in supplying fluctuating electric potentials to the cell electrodes and in decreasing the electric conductivity of the cell fluid simultaneously with the application of electric potentials to the cell.

10. Method for controlling a polarized beam of light by electric current impulses by means of a Kerr cell consisting in directing the light beam between the electrodes of the cell, in supplying the current impulses to the cell electrodes and in simultaneously applying to said electrodes a suitable direct current potential.

11. Means for controlling a polarized beam of light by relatively low potential electric current impulses comprising a Kerr cell having electrodes and a connection therefrom to the source of the current impulses, means for passing said light beam between said electrodes, and a direct current supply of suitable potential connected to said electrodes while said impulses are supplied thereto.

12. Means for controlling a polarized beam of light by relatively low potential electric current impulses comprising a Kerr cell having electrodes and a connection thereof with the source of the current impulses, the light beam being arranged to pass between said electrodes, and a direct current supply of suitable potential permanently connected to said electrodes.

13. A Kerr cell for controlling a light beam passing therethrough by means of an electrostatic field, having more than two electrodes arranged side by side and having alternating polarity for producing a plurality of adjacent electrostatic fields, the light beam being arranged to pass between said electrodes, whereby each of said adjacent fields controls a portion of the beam.

14. A Kerr cell for controlling a light beam passing therethrough by electric current impulses comprising a plurality of electrodes and a transparent chamber containing said electrodes and being filled with a transparent liquid of suitable dielectric strength and small conductivity and adapted to become double refractory in the presence of an electric field produced between said electrodes, said electrodes being disposed opposite each other sufficiently close to permit the use of comparatively low voltage for causing said double refraction, a source of suitable direct current potential connected with said electrodes for decreasing the conductively of said liquid, and a voltage amplifier for said impulses connected at its output side to said electrodes, whereby the amplified impulses are superimposed upon said direct current potential prevailing at said electrodes.

15. A Kerr cell having a plurality of electrodes and a transparent liquid medium contained in said cell and adapted in the presence of an electrostatic field between said electrodes to produce electric double refraction of a light ray passing through said cell, and means permanently applied to said medium for decreasing its electric conductivity.

16. A Kerr cell for controlling a light beam by electric current impulses comprising a plurality of electrodes between which the beam passes and a transparent chamber containing said electrodes and being filled with a transparent liquid of suitable dielectric strength and small conductivity and adapted to become double refractory in the presence of an electric field produced between said electrodes by said impulses, said electrodes being disposed opposite each other sufficiently close to permit the use of a comparatively low impulse voltage for causing said double refraction, and a source of suitable direct current potential connected to said electrodes for decreasing the electric conductivity of said liquid, said impulses being superimposed upon said direct current potential.

17. A Kerr cell having a plurality of electrodes separated by a thin layer of a transparent liquid medium adapted in the presence of an electrostatic field between said electrodes to produce electric double refraction of a light ray passing through said cell, means for applying desired signal currents in amplified pulses to said electrodes, means applied to the medium during the application of said signal currents decreasing the electrical conductivity thereof, whereby the said light rays are controlled in accordance with said desired signals.

18. An electrostatic means for controlling a beam of light comprising a Kerr cell provided with spaced electrodes, means for passing a plane-polarized beam of light between said electrodes, thermionic means for applying relatively low potential impulses to said electrodes, means for continually controlling said applied current impulses to keep said fluctuations in current on one side of a zero value of current, the direct current component of said applied current impulses being of such value as to apply a suitable direct current bias upon said cell, whereby said plane-polarized beam of light passing between said electrodes is elliptically polarized in accordance with the fluctuations in said current pulses applied above said zero value.

19. A Kerr cell comprising a plurality of electrode elements more than two in number.

20. A Kerr cell comprising a plurality of pairs of electrode elements.

21. A Kerr cell comprising a plurality of pairs of electrodes, the corresponding electrodes of each of the pairs being connected in parallel.

22. A Kerr cell comprising a plurality of pairs of interleaved electrode elements having light beams passing therebetween and the corresponding electrodes of each pair connected electrically in parallel so that adjacent electrodes have opposite polarity.

23. A light valve comprising a plurality of pairs of interleaved electrode elements having light beams passing therethrough and the corresponding electrodes of each pair connected electrically parallel so that adjacent electrodes have opposite polarity, and an optically active dielectric material between all of said electrodes.

24. Method for controlling a polarized beam of light by variable electric potentials by means of a Kerr cell consisting in directing the light beam between the electrodes in the said Kerr cell, in supplying the variable electric potentials to the said cell electrodes, and simultaneously decreasing the electric conductivity of the cell fluid.

25. Method for controlling a polarized beam of light by variable electric potentials by means of a Kerr cell consisting, in directing the light beam between the electrodes of the cell, in supplying variable electric potentials to the cell electrodes, and in simultaneously applying to the said electrodes a suitable direct curent bias potential.

26. An electrostatic light valve having electrodes and its associated circuits comprising thermionic amplifying means adapted to receive and amplify signalling impulses and having a resistance path included in its output circuit, and connections between the light valve electrodes and the ends of said resistance path, whereby the potential drop across said resistance path due to the direct current component of the amplifier output current, acts as a suitable bias for said light valve, and the variable potential drops across said path, due to the amplified signal impulses, actuate said light valve.

27. An electrostatic light valve having electrodes and its associated circuits comprising a thermionic amplifying tube having its input circuit connected to a source of signal impulses, and having a resistance included in its output circuit, and connections between the light valve electrodes and the ends of said resistance, whereby the potential drop across said resistance, due to the direct current component of the tube output current acts as a suitable bias for said light valve, and the variable potential drops across said resistance, due to the amplified signal impulses, actuate said light valve.

28. A circuit arrangement for an electrostatic light valve having electrodes, comprising two thermionic amplifier tubes with their associated circuits, said tubes being connected in series with respect to their plate-filament circuits, and connections between the electrodes of the light valve and the filament and plate of one of said tubes, a source of signalling impulses connected to the input circuits of both tubes in push-pull relation, so that for a given signal impulse the plate-filament circuit of one tube constitutes a high resistance path and the plate-filament circuit of the other tube constitutes a low resistance path for the tube output currents, whereby amplified high and low potential signal impulses are applied to the electrodes of said light valve in accordance with the variations of the supplied signal impulses, and whereby the potential drop in the plate-filament path of the tube, connected to the light valve electrodes, due to the direct current component of the amplifier output currents acts as a suitable bias for said light valve.

29. An inertialess electrostatic means for controlling a polarized light beam in accordance with intensity variations in energy of signalling currents of which an electro-optical reproduction is to be made which comprises a Kerr cell having a plurality of electrode elements separated by a liquid dielectric material of high insulating power and through which liquid the polarized light beam is directed, and low loss and inertialess means for transferring said signalling energy to said cell including a vacuum tube voltage amplifier connected in series with the cell for impressing amplified voltage variations of the signals to be recorded upon the electrodes of the cell, whereby the electrical inertia of the entire system due to the inherent capacity of the cell is substantially reduced and the range of frequency to which the cell is responsive is materially increased.

In testimony whereof I affix my signature.

AUGUST KAROLUS.

CERTIFICATE OF CORRECTION.

Patent No. 1,885,604.

November 1, 1932.

AUGUST KAROLUS.

It is hereby certified that error appears in the printed specification of the above numbered patent requiring correction as follows: Page 3, after line 126, insert the following paragraph —

"Figure 3 illustrates a specially effective voltage amplification. The cell is placed in shunt with one of the two thermionic tubes 5 or 5', the tubes themselves being connected in series so far as their filament-plate circuits are concerned. The microphone input current acts on the two grids in opposite directions through the two transformers 10 and 10' in the fashion of a so-called push-pull connection so that when the resistance of one tube increases, that of the other drop. Thus, as is well known, practically the total potential difference of the anode battery 6 alternately exists at the two tubes at very small fluctuations of the microphone current; in other words the amplitude of the voltage applied to the Kerr cell is very great, and is the greater, the lower the conductivity of the cell liquid is, and the higher the voltage of the anode battery 6 is made."; page 6, line 45, claim 17, after "currents" insert the word "for"; and that the said Letters Patent should be read with these corrections therein that the same may conform to the record of the case in the Patent Office.

Signed and sealed this 3rd day of January, A. D. 1933.

(Seal)

M. J. Moore,
Acting Commissioner of Patents.